US008239265B2

(12) United States Patent
Patwa et al.

(10) Patent No.: US 8,239,265 B2
(45) Date of Patent: Aug. 7, 2012

(54) PROVIDING CONTEXTUAL ADVERTISEMENTS FOR ELECTRONIC BOOKS

(75) Inventors: Pritesh Patwa, Redmond, WA (US); Martin Markov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 12/695,639

(22) Filed: Jan. 28, 2010

(65) Prior Publication Data

US 2011/0184811 A1 Jul. 28, 2011

(51) Int. Cl.
*G06Q 30/00* (2012.01)
(52) U.S. Cl. .................................. 705/14.49
(58) Field of Classification Search ............... 705/14, 705/14.49
See application file for complete search history.

(56) References Cited

U.S. PATENT DOCUMENTS

| | | | |
|---|---|---|---|
| 7,849,081 B1* | 12/2010 | Chang et al. ................. 707/727 |
| 2001/0007980 A1* | 7/2001 | Ishibashi et al. ............. 705/26 |
| 2001/0049635 A1* | 12/2001 | Chung ........................ 705/26 |
| 2002/0035697 A1* | 3/2002 | McCurdy et al. ............ 713/200 |
| 2002/0107759 A1* | 8/2002 | An .............................. 705/26 |
| 2003/0061101 A1* | 3/2003 | Seet et al. ................... 705/14 |
| 2004/0138952 A1* | 7/2004 | Seet et al. ................... 705/14 |
| 2004/0260767 A1* | 12/2004 | Kedem et al. ............... 709/203 |
| 2005/0096979 A1 | 5/2005 | Koningstein |
| 2005/0125417 A1* | 6/2005 | Elgart .......................... 707/10 |
| 2005/0216516 A1* | 9/2005 | Calistri-Yeh et al. ........ 707/104.1 |
| 2005/0216823 A1 | 9/2005 | Petersen |
| 2006/0294084 A1* | 12/2006 | Patel et al. .................. 707/3 |
| 2007/0133067 A1* | 6/2007 | Garg .......................... 358/462 |
| 2007/0288454 A1 | 12/2007 | Bolivar |
| 2008/0077492 A1* | 3/2008 | Ho et al. .................... 705/14 |
| 2009/0112840 A1 | 4/2009 | Murdock |
| 2009/0171750 A1 | 7/2009 | Zhou et al. |
| 2009/0171751 A1* | 7/2009 | Zhou et al. ................. 705/10 |
| 2009/0216623 A1 | 8/2009 | Hendricks |
| 2010/0005061 A1* | 1/2010 | Basco et al. ............... 707/3 |
| 2010/0198693 A1* | 8/2010 | Lidwell et al. ............. 705/14.66 |
| 2011/0131094 A1* | 6/2011 | Chuang et al. ............. 705/14.61 |

OTHER PUBLICATIONS

Torrance, Kelly Jane. "And now a sponsor from our words . . . ; Contextual advertising to invade e-books?" The Washington Times, Jul. 17, 2009.*
"Agencies dubious about allowing ads onto Sony Reader," New Media Age, May 21, 2009.*
"WOWIO Introduces 'ebooks for Free' Concept to U.S. Readerdom," PR Newswire, Aug. 14, 2006.*

(Continued)

*Primary Examiner* — Michelle Tarae
(74) *Attorney, Agent, or Firm* — Shook, Hardy & Bacon L.L.P.

(57) ABSTRACT

Systems and methods for providing contextual advertisements to present to a user in association with electronic books are provided. Advertising entities may submit information to include in the contextual e-book advertisement. An advertisement manager identifies the e-book and content associated with each page therein. A target page to receive the advertisement is identified. The contextual e-book advertisement is generated using content associated with the target page as well as content associated with each page preceding the target page. Content associated with pages subsequent to the target page is analyzed to determine if the advertisement is appropriate for the target page. Additional sequential information and user profile information may be used to generate the contextual e-book advertisement. Based on the content of the e-book and the parameters of the information submitted by the advertising entity, a contextual e-book advertisement is generated for the target page and presented to a user.

20 Claims, 5 Drawing Sheets

OTHER PUBLICATIONS

Heim, Sarah. "First ads to debut on e-books," Adweek, Jun. 18, 2001.*
AdManage Unveils Display Ad Network: Published Date: May 1, 2009 http://it.tmcnet.com/topics/it/articles/55388-admanage-unveils-display-ad-network.htm.
EBook Reader Market Overview and Future Prospects: Published Date: Jun. 2009 http://www.infoedge.com/product_type.asp?product=RO-0035.
Amazon E-Book Sales to Hit $2.5 Billion in 2012; Will Add $330 Million to Op Income: Analyst http://www.washingtonpost.com/wp-dyn/content/article/2008/06/23/AR2008062300925.html.
Amazon's Patents Point to Kindle e-Book Ads http://www.internetnews.com/ec-news/article.php/3833051/Amazons+Patents+Point+to+Kindle+EBook+Ads.htm.
The e-Book Store http://ebookstore.sony.com/google-ebooks/.

* cited by examiner

PROVIDING CONTEXTUAL ADVERTISEMENTS FOR ELECTRONIC BOOKS

BACKGROUND

Electronic books (hereinafter "e-books") are becoming increasingly popular. With a high consumer demand, it is not surprising that advertisements are playing a more important role in association with e-books. Current advertising models are not developed to target the consumer using relevant information from the e-book. Contextual advertisements, as used herein, generally refer to advertisements that are aware of the content of the hosting resource (e.g., a web site, a web page, an e-book, etc.). Contextual advertisements may provide targeted advertising to consumers using relevant consumer information, as well as contextual information associated with the e-book hosting the advertisement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to systems, methods, and computer-storage media having computer-executable instructions embodied thereon that, when executed, perform methods for providing contextual advertisements presented to a user in association with electronic books. Information to be included in a contextual advertisement is received and an electronic book, including a plurality of pages, is identified. A target page within the electronic book's plurality of pages is identified, along with content thereon. Based on the content of the target page and content of each page preceding the target page, the contextual advertisement is generated and presented to the user. Specific embodiments of the present invention relate to using content associated with the target page, content associated with each page preceding the target page, content associated with each page subsequent to the target page, a user profile, or a combination thereof, to generate the contextual advertisement.

Additional objects, advantages, and novel features of the invention will be set forth in part in the description which follows, and in part will become apparent to those skilled in the art upon examination of the following, or may be learned by practice of the invention.

BRIEF DESCRIPTION OF THE SEVERAL VIEWS OF THE DRAWING

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to providing contextual advertisements presented to a user in association with e-books. Utilizing systems, methods, and computer-storage media described herein, an e-book including a plurality of pages is identified. Each page of the plurality of pages may be associated with content thereon. The contextual advertisements are generated such that the advertisement for a target page includes content associated with the target page and any page preceding the target page. Specific embodiments of the present invention may utilize a user profile to generate the contextual advertisement, as well as content associated with pages subsequent to the target page.

Accordingly, in one aspect, an embodiment of the present invention is directed to one or more computer-storage media having computer-executable instructions embodied thereon that, when executed by a computing device, perform a method for providing contextual advertisements presented to a user in association with e-books. The method includes receiving information to be included in a contextual advertisement for presentation to the user. An e-book including a plurality of pages is identified along with content associated with each one of the plurality of pages. Based on the content of a target page of the plurality of pages and each page preceding the target page, a contextual advertisement is generated and presented to the user.

In another aspect, an embodiment of the present invention is directed to one or more computer-storage media having computer-executable instructions embodied thereon that, when executed by a computing device, perform a method for providing contextual advertisements presented to a user in association with e-books. The method includes receiving information to be included in a contextual advertisement for presentation to the user. An e-book including a plurality of pages is identified. Content associated with each one of the plurality of pages is also identified. A user profile associated with a user is received. A target page of the plurality of pages is identified to receive the contextual advertisement. Based on the content of the target page and the user profile, the contextual advertisement is generated and presented to the user.

A further embodiment of the present invention is directed to a method for providing contextual advertisements presented to a user in association with e-books. The method includes receiving information to be included in a contextual advertisement for presentation to the user in association with an e-book. The e-book, including a plurality of pages, is identified along with content associated with each one of the plurality of pages. Based on content of a target page and content of each page preceding the target page, a contextual advertisement is generated. A determination is made whether the contextual advertisement includes content that is associated with one or more pages subsequent to the target page. Upon determining that the contextual advertisement does not include content associated with one or more pages subsequent to the target page, the contextual advertisement is presented to the user. Upon determining that the contextual advertisement does include content associated with one or more pages subsequent to the target page, an updated contextual advertisement is generated and presented to the user.

Having briefly described an overview of embodiments of the present invention, an exemplary operating environment in which embodiments of the present invention may be implemented is described below in order to provide a general context for various aspects of the present invention. Referring to the figures in general, and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
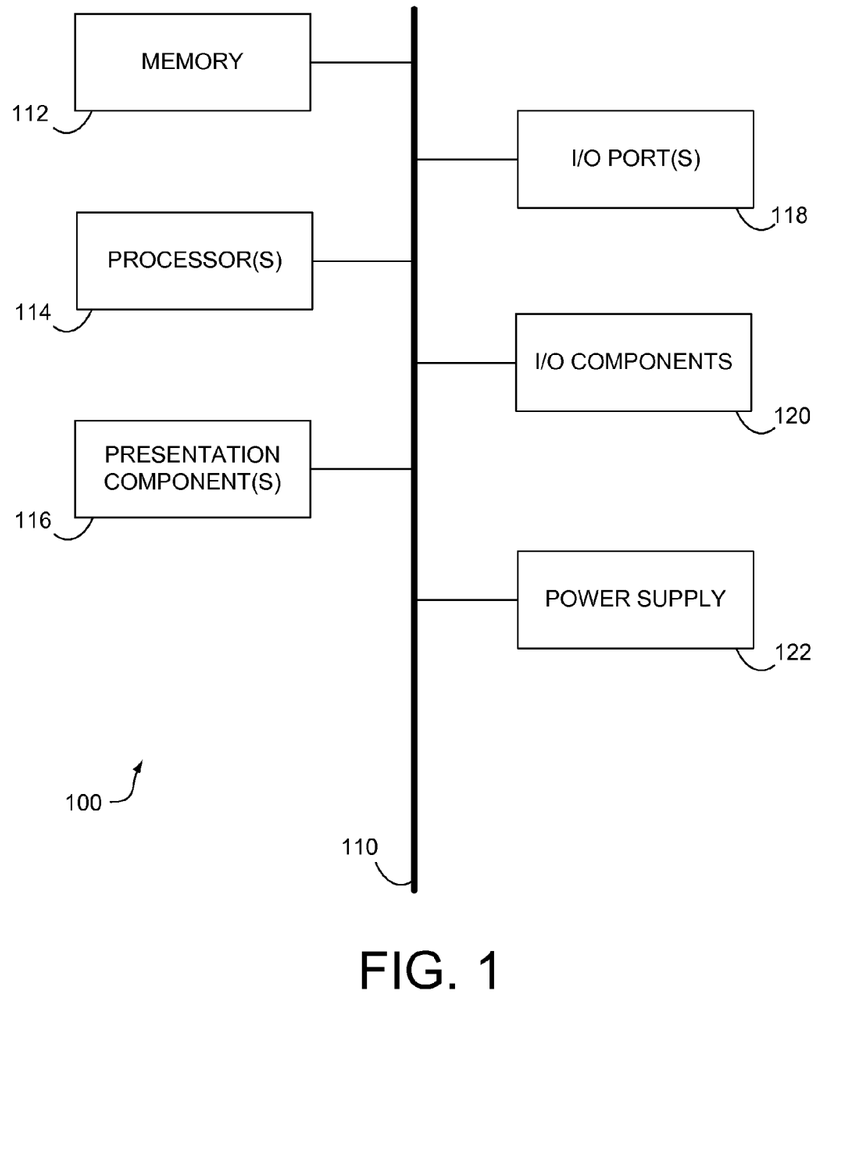
FIG. 1 is a block diagram of an exemplary computing environment suitable for use in implementing embodiments of the present invention.

With reference to FIG. 1, the computing device 100 includes a bus 110 that directly or indirectly couples the following devices: a memory 112, one or more processors 114, one or more presentation components 116, input/output ports 118, input/output components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above should also be included within the scope of computer-readable media.

The memory 112 includes computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As indicated previously, embodiments of the present invention are directed to providing contextual advertisements to present to a user in association with e-books using content of the e-book to generate the contextual advertisement. Embodiments of the invention further provide advertisements in association with e-books using content of a target page as well as content of each page preceding and subsequent to the target page. Embodiments of the present invention further provide advertisements in association with e-books using user profile information. Further embodiments of the present invention provide advertisements in association with e-books using content of separate e-books that are related to the current e-book to receive the advertisements, e.g., a prequel to the e-book. As will be described in further detail below, providing contextual advertisements to present to users in association with e-books provides page-wise targeted advertisements for a specific e-book.

Figure 2:
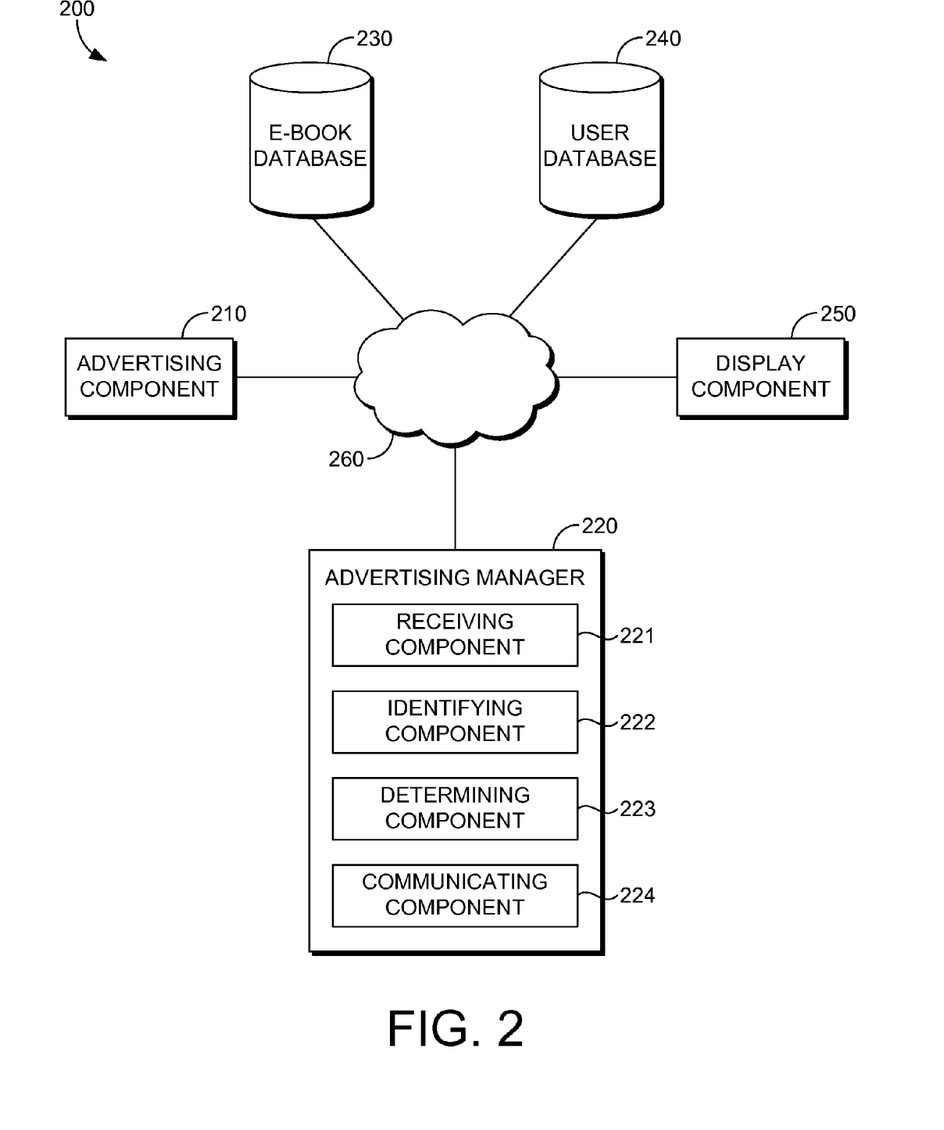
FIG. 2 is a block diagram of an exemplary computing system in which embodiments of the present invention may be employed.

Referring now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, computing system 200 generally includes an advertising component 210, an advertising manager 220, an e-book database 230, a user database 240, and a display component 250. The advertising component 210 and advertising manager 220 may each include any type of computing device, such as the computing device 100 described with reference to FIG. 1, for example. The components of the computing system 200 may communicate with each other via a network 260, which may be wired, wireless, or both, and include, without limitation, one or more local area networks (LANs) and/or wide area networks (WANs). Such networking environments are commonplace in offices, enterprise-wide computer networks, intranets, and the Internet. Accordingly, the network 260 is not further described herein.

It should be understood that any number of display components, advertising components, advertising managers, and databases may be employed within the computing system 200 within the scope of embodiments of the present invention. For instance, the advertising manager 220 may comprise multiple devices arranged in a distributed environment that collectively provide the functionality of the advertising manager 220 described herein. Additionally, other components not shown may also be included within the computing system 200.

Generally, the system 200 illustrates an environment in which advertising entities may provide information to include in an e-book advertisement and, based on content of the identified e-book, a contextual advertisement is generated and presented to a user in association with the e-book. As will be described in further detail below, providing contextual advertisements to present to users in association with e-books provides page-wise targeted advertisements for a specific e-book.

A contextual advertisement, as used herein, generally refers to advertisements that are aware of the content of the hosting resource (e.g., a web site, a web page, an e-book, etc.). By way of example only, if a web page for a travel agency is viewed, an advertisement for a rental car agency may additionally be presented in association with the web page as a contextual advertisement.

Contextual ads for e-books require an advertisement display model different from conventional advertisement models. Conventional advertisement models rely almost exclusively on keyword identification within the hosting resource to generate a contextual advertisement. Due to the static content of an e-book, e-book advertisement models may focus on additional factors to generate contextual advertisements instead of merely focusing on specific keywords found within the e-book. Additional factors may include content of the e-book. Content of an e-book may include various components including, but not limited to, sequence, theme, characters, attributes of the characters, or the like, thus, providing a more targeted advertisement. Accordingly, since the content associated with an e-book is static, the e-book may be processed in advance to identify e-book attributes (e.g., characters, theme, sequence, etc.) and may then be stored for further use.

With continued reference to FIG. 2, the advertising component 210 may be any device and/or entity that is capable of providing information to be included in a contextual advertisement for an e-book. Accordingly, the advertising component 210 may take on a variety of forms, such as a personal computer (PC), a laptop computer, a mobile phone, a personal digital assistant (PDA), a server, or any other device that is capable of communicating information to be included in an advertisement. In one embodiment, the advertising component 210 may be a computing device such as computing device 100 of FIG. 1. Additionally, the advertising component 210 may be configured to be associated with a variety of entities that control communication of advertisements.

The advertising component 210, or any entity associated therewith, may be configured to provide information to include in contextual advertisements for e-books. The advertising component 210 may include certain parameters regarding presenting an advertisement. For instance, the advertising component 210 may submit information to include in a jewelry advertisement, i.e., an ad set, specifying that advertisement should only appear on an e-book page that has a romantic theme between the characters. The advertising component 210 may also specify an advertising budget that affects the frequency with which the advertisement may be used. The advertisement generated using that ad set should comply with the specified parameters from the advertising component 210.

The advertising component 210 communicates the information to include in the e-book contextual advertisement to the advertising manager 220 via the network 260. The advertising manager 220 may be any device and/or entity that is capable of providing an e-book advertisement. Accordingly, the advertising manager 220 may take on a variety of forms, such as a personal computer (PC), a laptop computer, a mobile phone, a personal digital assistant (PDA), a server, or any other device that is capable of providing an e-book advertisement. In one embodiment, the advertising manager 220 may be a computing device such as computing device 100 of FIG. 1.

The advertising manager 220 may include a receiving component 221, an identifying component 222, a determining component 223, and a communicating component 224. The receiving component 221 is configured to receive the information to be included in an e-book contextual advertisement from the advertising component 210. The information to be included may also be associated with an advertisement category such that it may easily be identified by the advertisement category and may be associated with a category of the e-book. The information to be included in the e-book, along with the associated category, may be stored for future use with an appropriate e-book.

The receiving component 221 may also be configured to receive e-books that are to receive contextual advertisements. Once e-books are received, the e-book, and the content thereof, may be identified by the identifying component 222. The identifying component 222 may be configured to identify an e-book that is to receive contextual advertisements. An e-book may be identified from data in the e-book database 230. Alternatively, the data needed to identify the e-book may be internally accessible by advertising manager 220, such that an external database is not necessary.

The e-book may be identified by title, author, or the like, and may comprise a plurality of pages. Each page therein may be identified as including specific page-wise content, i.e., each page may include static content that is associated with a specific page. For example, the content that is associated with page 5 of the e-book will not change as the user progresses through the e-book or if a second user accesses the e-book. Further, the content that is associated with page 5 of the e-book is specific to that particular page and may or may not be the same as content identified on page 13 of the e-book.

The identifying component 222 may identify a sequence of the e-book, along with characters, a theme, or the like. E-book advertisements are unique in that they may rely on a sequence of the e-book, thus, providing the assumption that a user is familiar with each page preceding the target page. The sequence of an e-book may be based on content within the e-book and content that is not within the e-book. For example, the identifying component 222 may identify one or more prequels as part of an e-book's sequence. The same sequential assumptions may be made with respect to prequels, i.e., the advertising manager 220 may assume that a user is familiar with content associated with the prequel(s) and the content associated with the prequel(s) may be used to generate a contextual e-book advertisement for the target page. On the same note, identifying component 222 may also identify one or more sequels associated with the current e-book as part of the e-book's sequence. The content of a sequel may be identified such that contextual advertisements do not give away content of the sequel, as described in further detail below.

The theme of the e-book may also be identified and used in the contextual e-book advertisement. The theme of the e-book may be used to identify an advertisement category relevant to the e-book or to a specific page of the e-book. That is, for a science-fiction-themed e-book, the advertisements may come from a science-fiction advertisement category or may be adapted to fit a science-fiction theme. For instance, the science-fiction e-book may include an advertisement categorized as a science-fiction advertisement (e.g., a light saber discount store advertisement) or may include an advertisement adapted to fit the science-fiction theme (e.g., a fast food restaurant advertisement that includes science-fiction design elements).

Additionally, e-books may have one or more characters that are identified throughout the story. Thus, the advertisements generated for the e-book may use characteristics of the characters within the advertisements. For instance, if an e-book is telling a story of a fat king and a skinny queen, an advertisement may portray the advertisement characters as a fat king and a skinny queen.

The identifying component 222, thus, identifies content associated with each page of an e-book. The identifying component 222 may index, by page number, each identifying attribute of the e-book. For example, a character attribute associated with page 5 may include a fat king but a character attribute associated with page 65 may include a skinny king. Once the identifying component 222 has analyzed and indexed the content of the e-book, or any e-books related thereto, a page-wise index may be associated with the e-book and saved for future use such that the advertising manager 220 does not need to analyze the content of the e-book again.

Once the attributes of the e-book have been identified, the advertising manager 220 may generate a static contextual advertisement or a dynamic contextual advertisement for the e-book. A static contextual advertisement, as used herein, refers generally to an advertisement that does not change within an e-book. Static contextual advertisements may be generated for an e-book and stored such that when a user accesses the e-book, the advertisements have already been generated. Static contextual advertisements do not change and, thus, the e-book may present, to multiple users, the same static advertisement on the same page of the same e-book. The static contextual advertisement for the specific page may be updated with a new static contextual advertisement when deemed appropriate by the advertising manager 220 (e.g., the advertising budget for a particular advertisement is expended).

In order to generate the static contextual advertisements, the e-book attributes identified and saved by the identifying component 222 are used to provide the contextual e-book advertisement. Once the e-book attributes are accessed, an advertisement from a corresponding advertisement category may be identified or an advertisement for the category may be designed.

If it has not already been determined, the determining component 223 may determine whether the advertisement is appropriate to display on a target page of the e-book. The determination may be based on content associated with the target page of the e-book. The advertisement may be appropriate based on content associated with the target page of the e-book when content associated with the advertisement corresponds to attributes of the target page identified by the identifying component 222. The advertisement may not be appropriate if the advertisement is associated with content that conflicts with attributes of the target page. For example, a travel e-book may include a contextual advertisement for an airline while the same airline advertisement may conflict with an e-book directed to the dangers of air travel.

The determination may also be based on content associated with each page preceding the target page of the e-book. Thus, the sequence of the preceding pages may be used to generate a more relevant advertisement since it may be assumed that content on each page preceding the target page is relevant to the target page and it is assumed to be familiar to the user. The advertisement may be appropriate when content associated with the advertisement corresponds to attributes of the target page and attributes of page preceding the target page that have been identified by the identifying component 222. The advertisement may not be appropriate if the advertisement is associated with content that conflicts with attributes of the target page and/or attributes of the preceding pages.

Further, the determination may be based on content associated with each page subsequent to the target page of the e-book. An advertisement may be appropriate when content associated with the advertisement corresponds to attributes of the target page. The advertisement may not be appropriate if the advertisement is associated with content that conflicts with attributes of the target page. The advertisement may also not be appropriate if the advertisement is associated with content that is associated with one or more pages subsequent to the target page and that content has not been previously identified in the target page or any page preceding the target page. In other words, if the advertisement "gives away" something that is going to happen in the e-book on a subsequent page, it may not be appropriate to present the advertisement on the target page. Once an advertisement is identified as including content that is associated with one or more pages subsequent to the target page, a determination may be made whether the content associated with one or more pages subsequent to the target page is associated with one or more pages preceding the target page and/or the target page.

If the content is not associated with content that is associated with one or more pages preceding the target page and/or the target page, the advertisement is not appropriate to present to a user. If the content is associated with content that is associated with one or more pages preceding the target page and/or the target page, the advertisement may be appropriate to present to a user.

If an advertisement is not appropriate to present to a user in association with the target page, an updated contextual advertisement may be generated. A determination may then be made whether the updated contextual advertisement is appropriate to present to a user based on content of the target page, content of each page preceding the target page, and/or content of each page subsequent to the target page of the e-book, as previously described. Updated contextual advertisements will continue to be generated until an advertisement that is appropriate to present to a user is generated.

Once an advertisement is determined to be appropriate to present to a user in association with a target page of the e-book, the communicating component 224 communicates the e-book, along with the appropriate advertisements, to the display component 250 to present to a user.

Advertising manager 220 may also generate dynamic contextual advertisements. A dynamic contextual advertisement, as used herein, refers generally to an advertisement that may change within the e-book and may be dynamically generated in substantially real-time upon receiving an indication that a user has requested an e-book. Dynamic advertisements may change within an e-book for a single user. For example, Advertisement A may be presented to User 1 at a first point in time on page 5. At a second point in time, User 1 may flip backwards from page 60 to page 5 to find Advertisement B.

Initially, in order to generate the dynamic contextual advertisements, the e-book attributes identified and saved by the identifying component 222 are used to provide the contextual e-book advertisement. Once the e-book attributes are accessed, an advertisement from a corresponding advertisement category may be identified or an advertisement for the category may be designed.

In embodiments, the contextual e-book advertisement may be generated based on user profile information. User profile information includes, but is not limited to, demographic information, geographical location, user preferences, search queries of the user, and the like. User profile information may be received from the user database 240. The user profile information allows a dynamic contextual e-book advertisement to not only target a specific page in a specific e-book but also to target a specific user for a specific page of the specific e-book.

If it has not already been determined, the determining component 223 may determine whether the advertisement is appropriate to present to a user on a target page of the e-book. The determination may be based on content associated with the target page of the e-book. The advertisement may be appropriate based on content associated with the target page of the e-book when content associated with the advertisement corresponds to attributes of the target page identified by the identifying component 222. The advertisement may not be appropriate if the advertisement is associated with content that conflicts with attributes of the target page.

The determination may also be based on content associated with each page preceding the target page of the e-book. Thus, the sequence of the preceding pages may be used to generate a more relevant advertisement since it may be assumed that content on each page preceding the target page is relevant to the target page and it is assumed to be familiar to the user. The advertisement may be appropriate when content associated with the advertisement corresponds to attributes of the target page and attributes of page preceding the target page that have been identified by the identifying component 222. The advertisement may not be appropriate if the advertisement is associated with content that conflicts with attributes of the target page and/or attributes of the preceding pages.

Further, the determination may be based on content associated with each page subsequent to the target page of the e-book. An advertisement may be appropriate when content associated with the advertisement corresponds to attributes of the target page. The advertisement may not be appropriate if the advertisement is associated with content that conflicts with attributes of the target page. The advertisement may also not be appropriate if the advertisement is associated with content that is associated with one or more pages subsequent to the target page and that content has not been previously identified in the target page or any page preceding the target page. In other words, if the advertisement "gives away" something that is going to happen in the e-book on a subsequent page, it may not be appropriate to present the advertisement on the target page. Once an advertisement is identified as including content that is associated with one or more pages subsequent to the target page, a determination may be made whether the content associated with one or more pages subsequent to the target page is associated with one or more pages preceding the target page and/or the target page.

If the content is not associated with content that is associated with one or more pages preceding the target page and/or the target page, the advertisement is not appropriate to present to a user. If the content is associated with content that is associated with one or more pages preceding the target page and/or the target page, the advertisement may be appropriate to present to a user.

If an advertisement is not appropriate to present to a user in association with the target page, an updated contextual advertisement may be generated. A determination may then be made whether the updated contextual advertisement is appropriate to present to a user based on content of the target page, content of each page preceding the target page, and/or content of each page subsequent to the target page of the e-book, as previously described. Updated contextual advertisements will continue to be generated until an advertisement that is appropriate to present to a user is generated.

Once an advertisement is determined to be appropriate to present to a user in association with a target page of the e-book, the communicating component 224 communicates the e-book, along with the appropriate advertisements, to the display component 250 to present to a user.

Those skilled in the art will appreciate that the present invention contemplates the presence of additional components and/or subcomponents of the illustrated system 200, and the components and/or subcomponents may be combined with one another and/or separated into new components and subcomponents.

Figure 3:
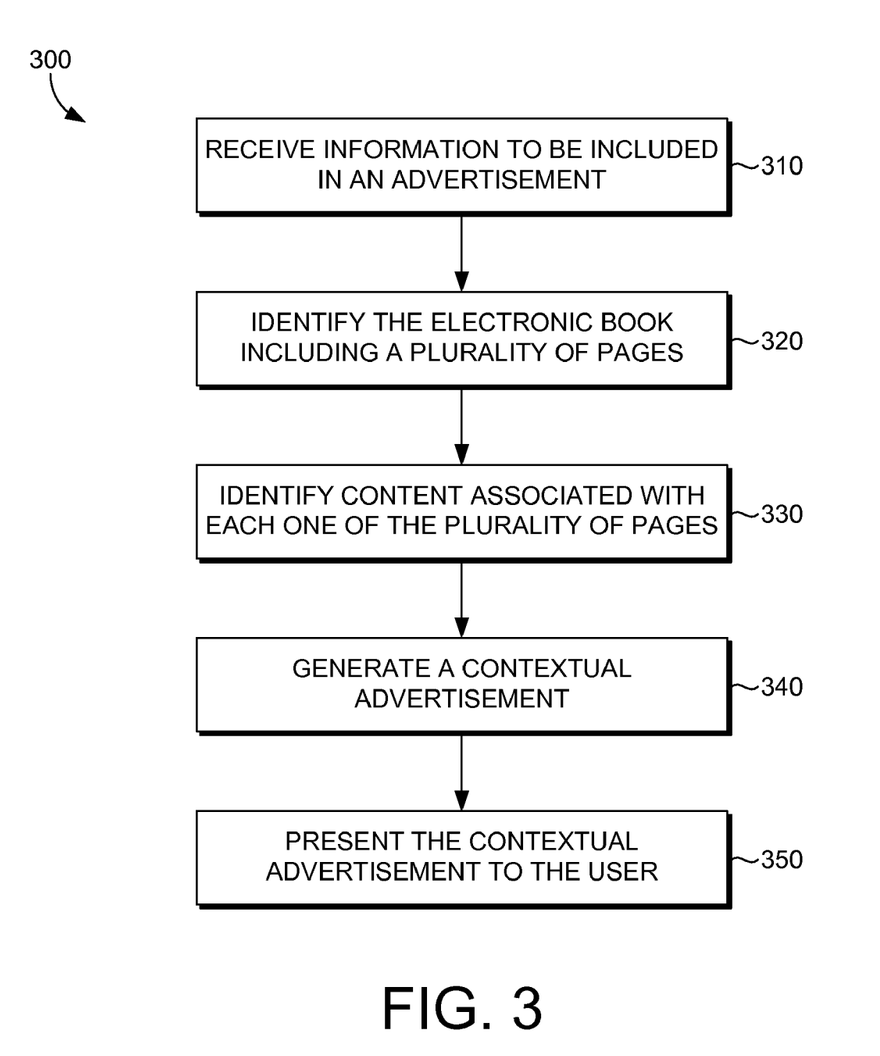
FIG. 3 is a flow diagram showing an exemplary method for providing contextual advertisements presented to a user in association with electronic books, in accordance with an embodiment of the present invention.

Turning now to FIG. 3, a flow diagram is provided that illustrates a method 300 for providing contextual advertisements to users in association with e-books, in accordance with an embodiment of the present invention. Initially, as indicated at block 310, information to be included in an advertisement is received (e.g., from the advertising component 210 to the receiving component 221 of the advertising manager 220 of FIG. 2).

The e-book, including a plurality of pages is identified at block 320. The e-book may be identified by title, author, or any other technique for identifying a particular e-book. Each page of the plurality of pages may be associated with content and the content of the plurality of pages is identified at block 330. The content of the e-book may include a theme of the e-book, characters, a sequence of the e-book, or the like. Each attribute (e.g., theme, characters, sequence) of each page may be stored in a page-wise index associated with the e-book.

A target page (i.e., a page of the e-book to present an advertisement) is identified, along with the content thereon. Each page preceding the target page is also identified, along with content thereon. In embodiments, a user profile, as well as any other e-books that are related to the e-book, may also be identified. Based on the content of the target page and each page preceding the target page, a contextual advertisement is generated at block 340. The contextual advertisement is then presented to the user at block 350.

Figure 4:
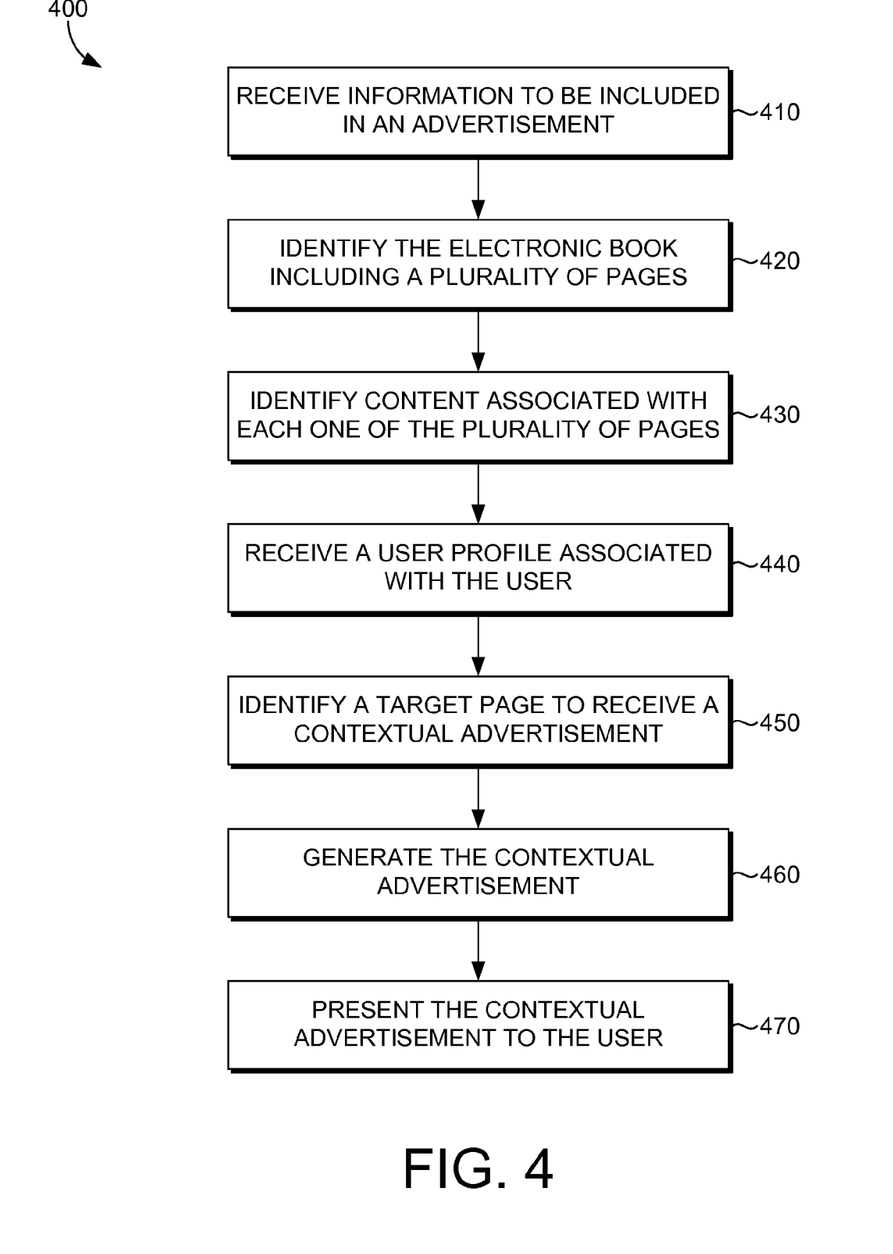
FIG. 4 is a flow diagram showing an exemplary method for providing contextual advertisements presented to a user in association with electronic books, in accordance with an embodiment of the present invention.

Turning now to FIG. 4, a flow diagram is provided that illustrates a method 400 for providing contextual advertisements to users in association with e-books, in accordance with an embodiment of the present invention. Initially, as indicated at block 410, information to be included in an advertisement is received (e.g., from the advertising component 210 to the receiving component 221 of the advertising manager 220 of FIG. 2). An e-book, including a plurality of pages, is identified at block 420. The e-book may be identified by title, author, or any other technique for identifying a particular e-book. Each page of the plurality of pages may be associated with content. Content associated with the page may include characters, sequence, theme, or the like. At block 430, the content associated with each of the plurality of pages is identified.

Once the content of each of the plurality of pages is identified, the content associated with each of the plurality of pages may be stored in a database for future access upon a user requesting the e-book. Once a user requests the e-book, a user profile of the requesting user is received at block 440. The user profile may include demographic information including, but not limited to, gender, geographical location, and the like, as well as user preferences, and any other characteristic that may be found in a user profile.

A target page within the plurality of pages is identified to receive the contextual advertisement at block 450. Based on the content associated with the target page and the user profile, the contextual advertisement is generated at block 460 and presented to the user at block 470.

Figure 5:
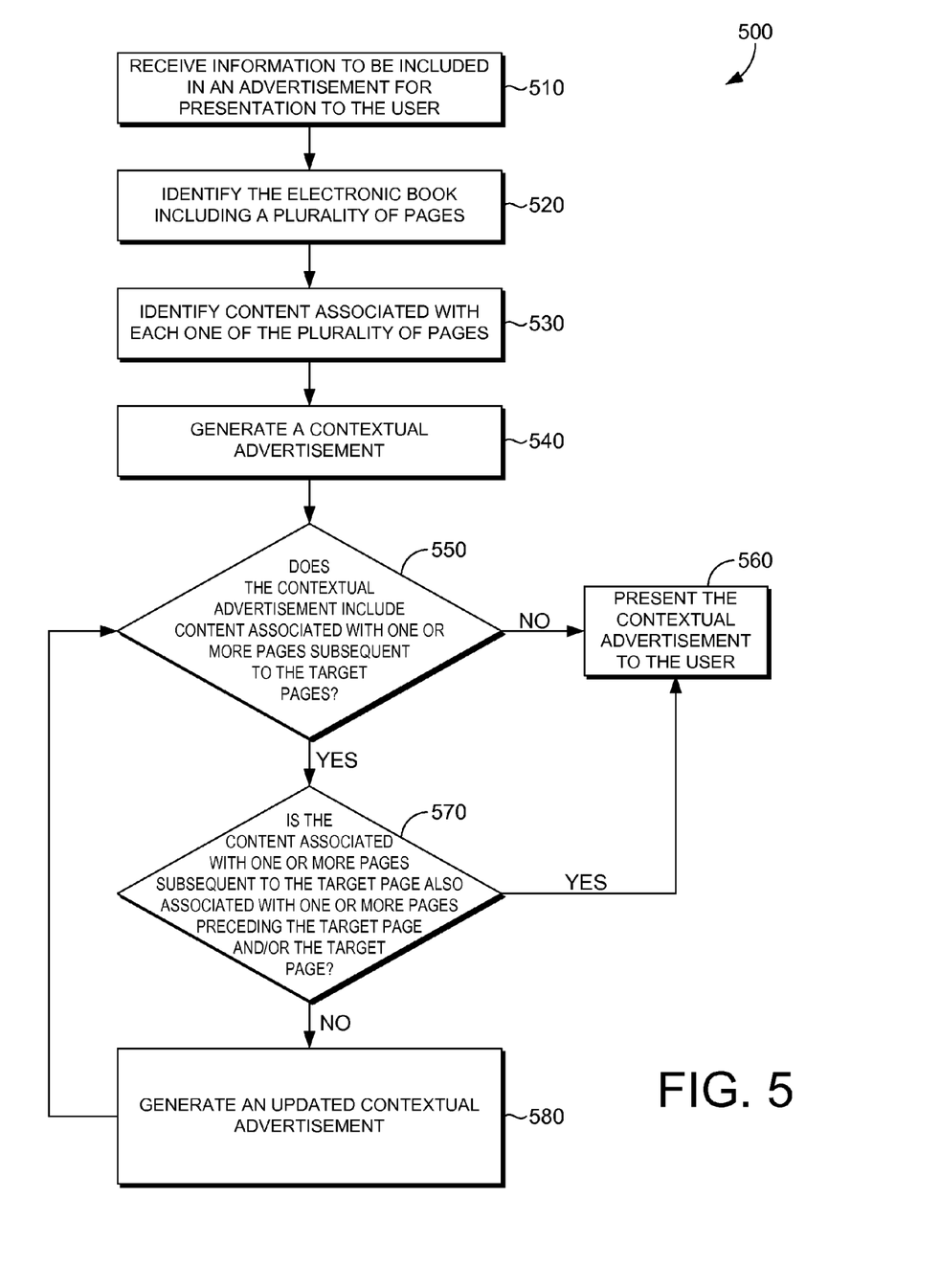
FIG. 5 is a flow diagram showing an exemplary method for providing contextual advertisements presented to a user in association with electronic books, in accordance with an embodiment of the present invention.

Turning now to FIG. 5, a flow diagram is provided that illustrates a method 500 for providing contextual advertisements to users in association with e-books, in accordance with an embodiment of the present invention. Initially, as indicated at block 510, information to be included in an advertisement is received (e.g., from the advertising component 210 to the receiving component 221 of the advertising manager 220 of FIG. 2). An e-book including a plurality of pages is identified at block 520. Content associated with each page of the plurality of pages is identified at block 530. Content associated with each page may include characters, sequence, theme, or the like. A target page (i.e., a page of the e-book to present an advertisement) is identified, along with the content thereon. Each page preceding the target page, including the content associated thereon, is also identified. In embodiments, a user profile, as well as any other e-books that may be related to the e-book, may also be identified.

Based on the content of the target page and the content of each page preceding the target page, a contextual advertisement is generated at block 540. A determination is then made at block 550 whether the contextual advertisement includes content that is associated with one or more pages subsequent to the target page. Based upon a determination that the contextual advertisement does not include content that is associated with one or more pages subsequent to the target page, the contextual advertisement is presented to the user at block 560.

Based upon a determination that the contextual advertisement does include content that is associated with one or more pages subsequent to the target page, a determination is made whether the content that is associated with one or more pages subsequent to the target page is also associated with one or more pages preceding the target page and/or the target page at block 570. Upon determining that the content that is associated with one or more pages subsequent to the target page is also associated with one or more pages preceding the target page and/or the target page, the advertisement may be presented to the user at block 560. That is, since the content is associated with either the target page or one or more pages preceding the target page, it may be determined that the advertisement is not foreshadowing or, "giving away", subsequent events of the e-book.

Upon determining that the content that is associated with one or more pages subsequent to the target page is not associated with one or more pages preceding the target page and/or the target page, an updated contextual advertisement is generated at block 580. The method then returns to block 550 and determines whether the updated contextual advertisement includes content associated with one or more pages subsequent to the target page. The method continues until an advertisement is generated that is appropriate to present to the user.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. One or more computer-storage media having computer-executable instructions embodied thereon that, when executed by a computing device, perform a method for providing contextual advertisements presented to a user in association with electronic books, the method comprising:
    receiving information to be included in a contextual advertisement for presentation to the user;
    identifying an electronic book including a plurality of pages;
    identifying content associated with each one of the plurality of pages;
    receiving a user profile associated with the user;
    comparing the information to be included in the contextual advertisement with content of a target page of the plurality of pages, the user profile, and content of one or more pages preceding the target page to determine whether the information to be included in the contextual advertisement corresponds with the content of the target page, the user profile, and the content of one or more pages preceding the target page; and
    based on determining that the information to be included in the contextual advertisement corresponds with the content of the target page, the user profile, and the content of one or more pages preceding the target page, presenting the contextual advertisement to the user.

2. The computer-storage media of claim 1, wherein the content includes a sequence of the electronic book, a character of the electronic book, or a theme of the electronic book.

3. The computer-storage media of claim 1, further comprising:
    generating the contextual advertisement based on a user profile of the user.

4. The computer-storage media of claim 3, wherein the user profile includes demographic information of the user.

5. The computer-storage media of claim 1, further comprising:
    generating the contextual advertisement based on content of one or more pages subsequent to the target page.

6. The computer-storage media of claim 1, further comprising:
    generating the contextual advertisement based on one or more prequels to the electronic book.

7. The computer-storage media of claim 1, further comprising:
generating the contextual advertisement based on one or more sequels to the electronic book.

8. One or more computer-storage media having computer-executable instructions embodied thereon that, when executed by a computing device, perform a method for providing contextual advertisements presented to a user in association with electronic books, the method comprising:
receiving information to be included in a contextual advertisement for presentation to the user;
identifying an electronic book including a plurality of pages;
identifying content associated with each one of the plurality of pages;
receiving a user profile associated with the user;
identifying a target page of the plurality of pages to receive the contextual advertisement;
based on content of the target page and the user profile, generating the contextual advertisement, where the information to be included in the contextual advertisement is associated with each of content of the target page, the user profile, and content of one or more pages preceding the target page; and
presenting the contextual advertisement to the user.

9. The computer-storage media of claim 8, wherein the content includes a sequence of the electronic book, a character of the electronic book, or a theme of the electronic book.

10. The computer-storage media of claim 8, wherein the user profile includes demographic information of the user.

11. The computer-storage media of claim 8, further comprising:
generating the contextual advertisement based on content of one or more pages subsequent to the target page.

12. The computer-storage media of claim 8, further comprising:
generating the contextual advertisement based on one or more prequels to the electronic book or one or more sequels to the electronic book.

13. The computer-storage media of claim 8, further comprising:
generating the contextual advertisement based on content of one or more pages preceding the target page.

14. A method for providing contextual advertisements presented to a user in association with electronic books, the method comprising:
receiving information to be included in a contextual advertisement for presentation to the user, wherein the contextual advertisement is presented to the user in association with an electronic book;
identifying the electronic book including a plurality of pages;
identifying content associated with each one of the plurality of pages;
based on content of a target page of the plurality of pages and content of one or more pages preceding the target page, generating the contextual advertisement;
determining, utilizing a first computing process, whether the contextual advertisement includes content associated with one or more pages subsequent to the target page;
based upon a determination that the contextual advertisement does not include content associated with one or more pages subsequent to the target page, presenting the contextual advertisement to the user;
based upon a determination that the contextual advertisement does include content associated with one or more pages subsequent to the target page, generating an updated contextual advertisement; and
presenting the updated contextual advertisement to the user,
wherein the first computing process is performed by one or more computing devices.

15. The method of claim 14, further comprising:
determining whether the content associated with the one or more pages subsequent to the target page is also associated with at least one of the target page or one or more pages preceding the target page.

16. The method of claim 15, further comprising:
upon determining that the content associated with the one or more pages subsequent to the target page is also associated with at least one of the target page or one or more pages preceding the target page, presenting the contextual advertisement to the user.

17. The method of claim 15, further comprising:
upon determining that the content associated with the one or more pages subsequent to the target page is not associated with at least one of the target page or one or more pages preceding the target page, generating the updated contextual advertisement.

18. The method of claim 14, further comprising:
determining whether the updated contextual advertisement includes content associated with the one or more pages subsequent to the target page; and
upon determining that the updated contextual advertisement does not include content associated with the one or more pages subsequent to the target page, presenting the updated contextual advertisement to the user.

19. The method of claim 18, further comprising:
upon determining that the updated contextual advertisement includes content associated with the one or more pages subsequent to the target page, determining whether the content associated with the one or more pages subsequent to the target page is also associated with at least one of the target page or one or more pages preceding the target page;
upon determining that the content associated with the one or more pages subsequent to the target page is also associated with at least one of the target page or one or more pages preceding the target page, presenting the updated contextual advertisement to the user; and
upon determining that the content associated with the one or more pages subsequent to the target page is not associated with at least one of the target page or one or more pages preceding the target page, generating a second updated contextual advertisement.

20. The method of claim 14, wherein the content includes a sequence of the electronic book, a character of the electronic book, or a theme of the electronic book.

* * * * *